(12) United States Patent
Ohta

(10) Patent No.: US 7,050,066 B2
(45) Date of Patent: May 23, 2006

(54) IMAGE PROCESSING APPARATUS AND IMAGE PROCESSING PROGRAM

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 227 days.

(21) Appl. No.: 10/209,661

(22) Filed: Aug. 1, 2002

(65) Prior Publication Data

US 2003/0090494 A1 May 15, 2003

(30) Foreign Application Priority Data

Nov. 12, 2001 (JP) .............................. 2001-345961

(51) Int. Cl.
- G09G 5/02 (2006.01)
- G09G 5/00 (2006.01)
- G06K 9/00 (2006.01)
- G06K 9/40 (2006.01)

(52) U.S. Cl. ...................... 345/611; 345/428; 345/589; 345/698; 382/165; 382/274; 382/254; 382/264; 382/266

(58) Field of Classification Search ................ 345/589, 345/593, 597, 611, 613, 618, 698–699, 690, 345/421, 426, 428; 382/165, 274–275, 254, 382/255, 264, 260, 266, 269; 348/578, 582, 348/597–599, 607
See application file for complete search history.

(56) References Cited

U.S. PATENT DOCUMENTS

| | | | |
|---|---|---|---|
| 4,463,380 A | 7/1984 | Hooks, Jr. | |
| 4,897,806 A | 1/1990 | Cook et al. | |
| 5,051,928 A * | 9/1991 | Gruters ....................... | 345/591 |
| 5,239,624 A | 8/1993 | Cook et al. | |
| 5,268,996 A | 12/1993 | Steiner et al. | |
| 5,357,579 A | 10/1994 | Buchner et al. | |
| 5,361,386 A | 11/1994 | Watkins et al. | |
| 5,363,475 A | 11/1994 | Baker et al. | |
| 5,394,516 A | 2/1995 | Winser | |
| 5,412,796 A | 5/1995 | Olive | |
| 5,420,971 A * | 5/1995 | Westerink et al. .......... | 382/199 |
| 5,432,895 A | 7/1995 | Myers | |
| 5,535,374 A | 7/1996 | Olive | |

(Continued)

FOREIGN PATENT DOCUMENTS

AU 727677 8/1999

(Continued)

OTHER PUBLICATIONS

Whitepaper: Implementing Fog in Direct3D, Jan. 3, 2000, www.nvidia.com.

(Continued)

Primary Examiner—Matthew C. Bella
Assistant Examiner—Wesner Sajous
(74) Attorney, Agent, or Firm—Nixon & Vanderhye, P.C.

(57) ABSTRACT

In an image processing apparatus, four images are generated by shifting an original image before antialiasing by one pixel upward, downward, leftward, and rightward. Between the images obtained by shifting upward and downward, a difference in color information is taken for every pixel to generate a differential image. Similarly, also between the images obtained by shifting leftward and rightward, a difference in color information is taken to generate another differential image. Then, from these two differential images, a product of two difference values is calculated for every pixel for calculating a corner's degree for every pixel. Then, for every pixel, the original image and a blurred original image are blended according to the corner's degree, thereby generating an output image. Consequently, it is possible to obtain a clear image with only corners effectively blurred.

37 Claims, 7 Drawing Sheets

U.S. PATENT DOCUMENTS

| | | | |
|---|---|---|---|
| 5,594,854 A | 1/1997 | Baldwin et al. | |
| 5,600,763 A | 2/1997 | Greene et al. | |
| 5,651,104 A | 7/1997 | Cosman | |
| 5,684,939 A | 11/1997 | Foran et al. | |
| 5,712,924 A * | 1/1998 | Fujimoto et al. | 382/165 |
| 5,724,561 A | 3/1998 | Tarolli et al. | |
| 5,742,410 A | 4/1998 | Suzuki | |
| 5,764,228 A | 6/1998 | Baldwin | |
| 5,818,456 A | 10/1998 | Cosman et al. | |
| 5,835,096 A | 11/1998 | Baldwin | |
| 5,859,645 A | 1/1999 | Latham | |
| 5,877,771 A | 3/1999 | Drebin et al. | |
| 5,886,701 A | 3/1999 | Chauvin et al. | |
| 5,943,060 A | 8/1999 | Cosman et al. | |
| 5,949,428 A | 9/1999 | Toelle et al. | |
| 5,977,984 A | 11/1999 | Omori | |
| 5,990,903 A | 11/1999 | Donovan | |
| 6,005,582 A | 12/1999 | Gabriel et al. | |
| 6,028,608 A | 2/2000 | Jenkins | |
| 6,038,031 A | 3/2000 | Murphy | |
| 6,064,392 A | 5/2000 | Rohner | |
| 6,072,500 A | 6/2000 | Foran et al. | |
| 6,426,755 B1 * | 7/2002 | Deering | 345/581 |
| 6,459,734 B1 * | 10/2002 | Kato et al. | 375/240.12 |
| 6,469,707 B1 | 10/2002 | Voorhies | |
| 6,496,187 B1 | 12/2002 | Deering et al. | |
| 6,608,942 B1 * | 8/2003 | Le | 382/279 |
| 6,628,830 B1 * | 9/2003 | Yamazoe et al. | 382/168 |
| 2002/0008879 A1 * | 1/2002 | Morimatsu | 358/1.9 |
| 2002/0159616 A1 * | 10/2002 | Ohta | 382/104 |
| 2003/0091229 A1 * | 5/2003 | Edge et al. | 382/162 |
| 2003/0095134 A1 * | 5/2003 | Tuomi et al. | 345/611 |
| 2003/0210409 A1 * | 11/2003 | Huang et al. | 358/1.1 |
| 2004/0227758 A1 * | 11/2004 | Curry et al. | 345/426 |

FOREIGN PATENT DOCUMENTS

| | | |
|---|---|---|
| EP | 1 054 350 | 4/2000 |
| JP | 7-170420 | 7/1995 |
| JP | 10-224637 | 8/1998 |
| JP | 2000-123162 | 4/2000 |

OTHER PUBLICATIONS

U.S. Appl. No. 09/726,226 (commonly assigned).
Akeley, K. "Reality Engine Graphics", 1993, Silicon Graphics Computer Systems, pp. 109-116.
Office Action in JP 2001-345961, Jan. 25, 2006.

* cited by examiner v : DIFFERENCE IN COLOR INFORMATION OF TWO PIXELS VERTICALLY ADJACENT TO TARGET PIXEL
h : DIFFERENCE IN COLOR INFORMATION OF TWO PIXELS HORIZONTALLY ADJACENT TO TARGET PIXEL
c : CORNER'S DEGREE

IMAGE PROCESSING APPARATUS AND IMAGE PROCESSING PROGRAM

BACKGROUND OF THE INVENTION

1. Field of the Invention

The present invention relates to image processing apparatuses and image processing programs and, more specifically, to an image processing apparatus and an image processing program for antialiasing an image to be displayed on a display.

2. Description of the Background Art

When an image including graphics, patterns, and others is displayed on a computer screen, some lines and boundary portions (or outline portions) of the graphics and patterns appear jagged on the screen because these graphics and patterns are composed of tiny square-shaped pixels. To smooth such jaggies, image processing called antialiasing is performed. Typical antialiasing includes oversampling and overlaying.

In oversampling, when a three-dimensional (3D) object represented by polygons is transformed to two-dimensional (2D) image data, for example, edge portions of the polygons are calculated at a resolution higher than that of display. Based on the calculation results, the color of the edge portions and background color are blended for display.

In overlaying, for example, after a 3D object is transformed to 2D image data, the color of a boundary portion of graphics and patterns is blended with the color of a portion surrounding the boundary portion for display.

The above-mentioned antialiasing, however, has drawbacks as follows.

That is, in oversampling, the edge portion of the polygons is calculated at a resolution higher than that of display. This requires larger memory capacity. Also, as calculation of the edge portion increases processing load, the processing load greatly varies depending on how many polygons are required to be drawn. For these reasons, oversampling is not suitable when stable operation is desired. Especially, in game processing, game images have to be stably generated with user's operation reflected thereon, at a rate of sixty images per second, for example. The larger the number of polygons to be drawn becomes, the more time the antialiasing takes, causing delay in game processing and, as a result, possibly causing a frame dropout.

In overlaying, on the other hand, the above-described color blending processing is carried out at every color boundary portion. That is, portions other than the jagged ones are also processed. Therefore, the entire boundary portion of graphics and patterns appears blurred, causing the entire image to appear blurred.

SUMMARY OF THE INVENTION

Therefore, an object of the present invention is to provide an image processing apparatus capable of generating a clear image not having conspicuous jaggies without requiring a large memory capacity or imposing a large processing load.

The present invention has the following features to attain the object mentioned above. Note that reference numerals and step numbers in parentheses are shown only for assisting the understanding of the present invention, and do not limit the scope of the present invention.

That is, according to a first aspect, an image processing apparatus for antialiasing an image displayed on a display unit (display unit 15 in the preferred embodiment) includes corner determining means (coprocessor 12 executing step S203 and S204; hereinafter merely steps are indicated) and blurring means (S205). The corner determining means determines whether an arbitrary pixel of image data represents a corner. Here, the corner is represented by any pixel composing a portion appearing jagged, the portion where at least successive two sides of the pixel meet other pixels differed in color. The blurring means blurs the pixel determined by the corner determining means as representing the corner. Thus, it is possible to generate a clear image with some portions effectively blurred without requiring a large memory capacity or imposing a large processing load. With the above processing, only the jagged portions (corners) appear blurred, while the others appear unblurred (clear as the original image). As a result, obtained is a clear image with the jaggies relatively inconspicuous.

Also, according to a second aspect, when the arbitrary pixel of the image data is taken as a target pixel, the corner determining means determines whether the target pixel represents the corner based on a difference (v) in color information between two pixels vertically adjacent to the target pixel and/or a difference (h) in color information between two pixels horizontally adjacent to the target pixel. Thus, whether the target pixel represents the corner can be effectively determined based on the image data.

Furthermore, according to a third aspect, the corner determining means determines that the target pixel represents the corner when there are the difference (v≠0) in color information between the two pixels vertically adjacent to the target pixel and the difference in color information (h≠0) between the two pixels horizontally adjacent to the target pixel. Thus, whether the target pixel represents the corner can be reliably determined based on the image data in a simple manner.

Still further, according to a fourth aspect, the blurring means includes blurred image generating means (S201). The blurred image generating means generates blurred image data (BPIC) by previously blurring the image data. The blurring means blurs the arbitrary pixel determined by the corner determining means as representing the corner by referring to a pixel of the blurred image data corresponding to the arbitrary pixel. Thus, with the use of the blurred image data previously generated in a simple manner, it is possible to more easily generate a clear image with some portions effectively blurred.

Still further, according to a fifth aspect, the corner determining means calculates a corner's degree (c) indicating how much the arbitrary pixel of the image data represents the corner. The blurring means blurs the arbitrary pixel of the image data based on the corner's degree. Thus, it is possible to effectively blur the jaggies according to the corner's degree.

Still further, according to a sixth aspect, when the arbitrary pixel of the image data is taken as a target pixel, the corner determining means calculates the corner's degree of the target pixel based on a difference (v) in color information between two pixels vertically adjacent to the target pixel and a difference (h) in color information between two pixels horizontally adjacent to the target pixel. Thus, the corner's degree of the target pixel can be effectively determined base on the image data.

Still further, according to a seventh aspect, the corner determining means calculates the corner's degree by finding a product of the difference in color information between the two pixels vertically adjacent to the target pixel and the difference in color information between the two pixels horizontally adjacent to the target pixel. Thus, the corner's degree of the target pixel can be reliably determined based on the image data in a simple manner.

Still further, according to an eighth aspect, the blurring means includes blurred image generating means (S201). The blurred image generating means generates blurred image data (BPIC) by previously blurring the image data. The blurring means blurs the image data by blending color information (color (CPIC, x, y)) of the arbitrary pixel of the image data with color information (color (BPIC, x, y)) of a pixel of the blurred image data corresponding to the arbitrary pixel at a rate corresponding to the corner's degree. Thus, with the use of the blurred image data previously generated in a simple manner, it is possible to more easily generate an image with the jaggies effectively blurred according to the corner's degree.

Still further, according to a ninth aspect, the image data has color information in an RGB (red, green, and blue) system. Also, the corner determining means and the blurring means carry out processing on each of R, G, and B in the RGB system separately. Thus, it is possible to reliably detect, for example, the corner located at a boundary portion of two areas having the same lightness but differing in color. Therefore, whether the target pixel represents the corner can be more reliably determined.

Still further, according to a tenth aspect, the image processing apparatus further includes monochrome image generating means. The monochrome image generating means generates, based on color information of the image data, monochrome image data composed of color information indicating only lightness. The corner determining means determines whether the arbitrary pixel of the image data represents the corner based on the monochrome image data. Thus, whether the arbitrary pixel represents the corner can be easily determined based on the monochrome color information in a simple manner, thereby further reducing the processing load.

Still further, an eleventh aspect is directed to an image processing program embodied on a storage medium (memory 13, game disc 17) readable by a computer (coprocessor 12), the program for antialiasing an image displayed on a display unit (display unit 15). The program includes a corner determining step (S203, S204) and a blurring step (S205). In the corner determining step, whether an arbitrary pixel of image data represents a corner is determined based on the image data. In the blurring step, the arbitrary pixel determined in the corner determining step as representing the corner is blurred. With this, it is possible to cause the computer to generate a clear image with some portions effectively blurred without requiring a large memory capacity or imposing a large processing load.

Still further, a twelfth aspect is directed to an image processing program embodied on a storage medium (memory 13, game disc 17) readable by a computer (coprocessor 12), the program for antialiasing an image displayed on a display unit (display unit 15). the program includes: a step (S201) of generating blurred image data (BPIC) by previously blurring image data; a step (S202) of sequentially selecting one of pixels of the image data as a target pixel; a step (S203) of calculating a first difference (v) in color information between two pixels vertically adjacent to the target pixel; a step (S203) of calculating a second difference (h) in color information between two pixels horizontally adjacent to the target pixel; a step (S204) of calculating a corner's degree (c) indicating how much the target pixel represents the corner based on the first and second differences; and a step (S205) of blurring the target pixel by referring to color information of a pixel of the blurred image data corresponding to the target pixel at a rate corresponding to the corner's degree. With this, it is possible to cause the computer to generate a clear image with some portions effectively blurred without requiring a large memory capacity or imposing a large processing load.

Still further, a thirteenth aspect is directed to an image processing program embodied on a storage medium (memory 13, game disc 17) readable by a computer (coprocessor 12), the computer program for antialiasing an image displayed on a display unit (display unit 15). The computer program causes the computer to perform: a step (S201) of generating blurred image data (BPIC) by previously blurring image data; a step of generating monochrome image data composed of color information indicating only lightness, based on color information of the image data; a step (S202) of sequentially selecting one of pixels of the image data as a target pixel; a step (S203) of calculating a first difference (v) in color information between two pixels vertically adjacent to the target pixel; a step (S203) of calculating a second difference (h) in color information between two pixels horizontally adjacent to the target pixel; a step (S204) of calculating a corner's degree (c) indicating how much the target pixel represents the corner based on the first and second differences; and a step (S205) of blurring the target pixel by referring to color information of a pixel of the blurred image data corresponding to the target pixel at a rate corresponding to the corner's degree. Thus, it is possible to cause the computer to generate a clear image with some portions effectively blurred without requiring a large memory capacity or imposing a large processing load. Also, whether the arbitrary pixel represents the corner can be determined with the monochrome color information in a simple manner, thereby further reducing the processing load.

These and other objects, features, aspects and advantages of the present invention will become more apparent from the following detailed description of the present invention when taken in conjunction with the accompanying drawings.

DESCRIPTION OF THE PREFERRED EMBODIMENT

Hereinafter described is an embodiment of the present invention with reference to the drawings.

Figure 1:
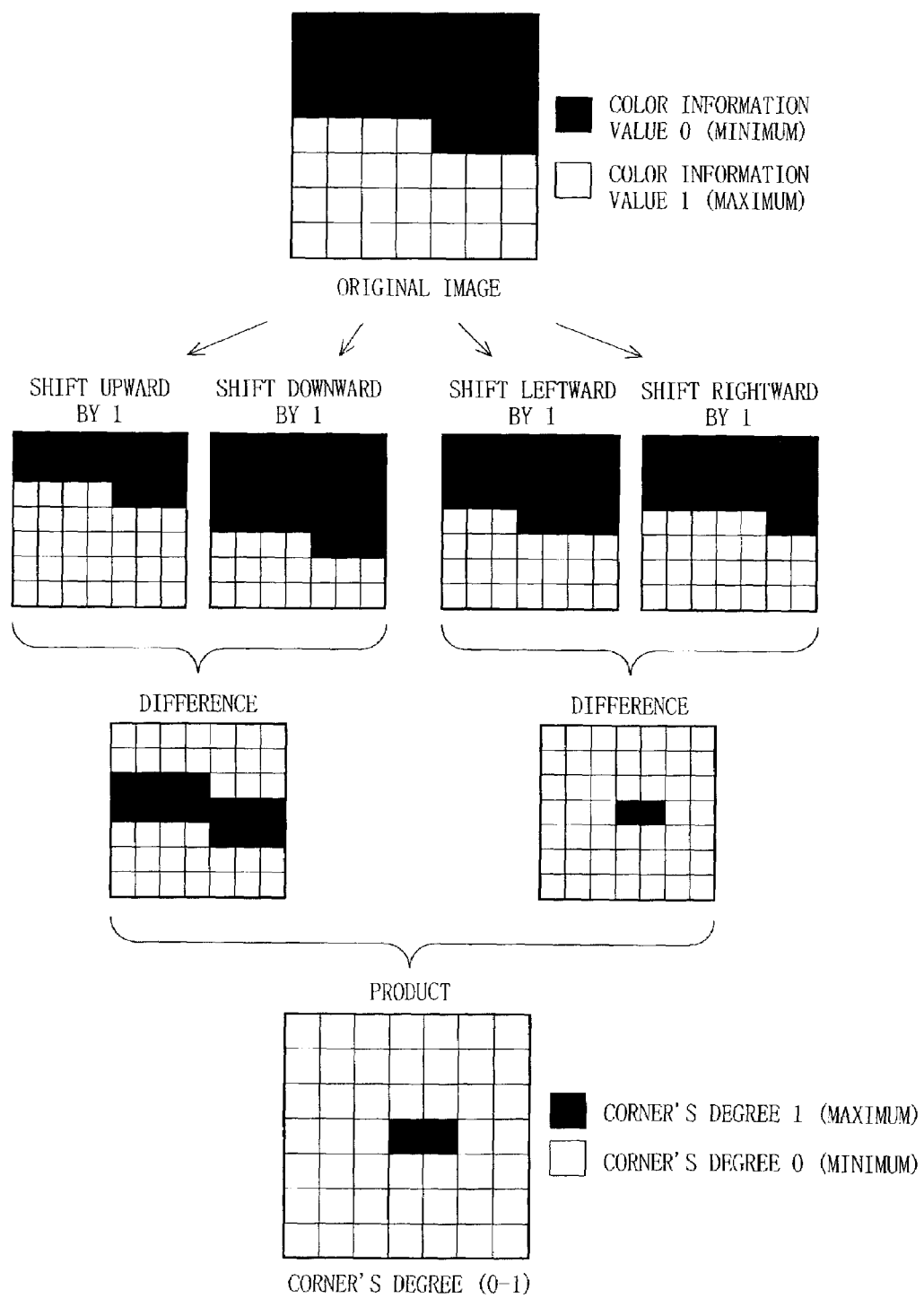
FIG. 1 is an illustration for demonstrating the principle of antialiasing of the present invention.
Figure 2:
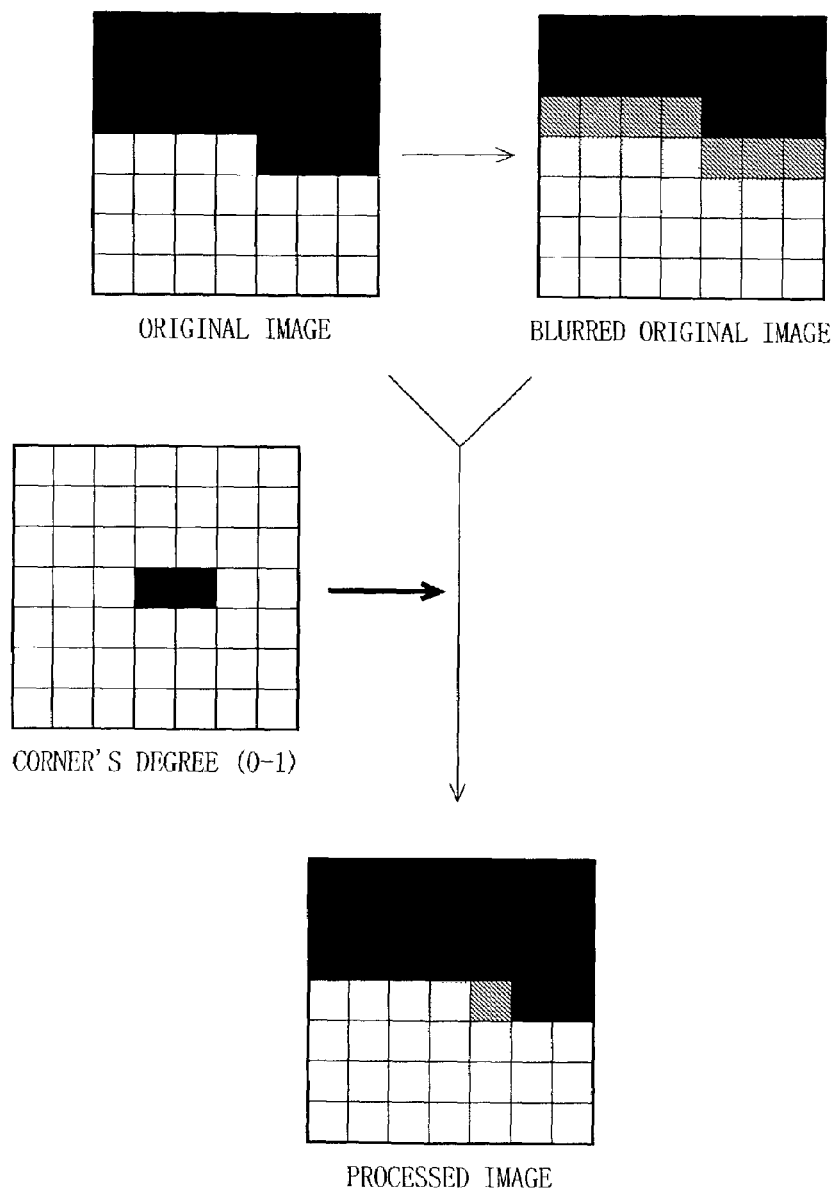
FIG. 2 is another illustration of demonstrating the principle of antialiasing of the present invention.

With reference to FIGS. 1 and 2, first described is the principle of image processing of the present invention. The present invention is characterized by generating a clear image with only jaggies effectively blurred. Take, as an example, an original image of 7×7 pixels before antialiasing, as illustrated in FIG. 1 on top. Black pixels represent that their color information (lightness, for example) indicates 0 on a scale of 0 to 1, while white pixels represent their color information indicates 1. Here, for the sake of simplification, the color information of each pixel indicates either 0 or 1. In practice, however, it can take an arbitrary value from 0 to 1.

This "original image" is shifted by one pixel upward, downward, leftward, and rightward for generating four new images. Then, between the images generated by shifting upward and downward, respectively, a difference in color information for each pixel is taken for generating a differential image. Similarly, between the images generated by shifting leftward and rightward, respectively, a difference in color information of each pixel is taken for generating another differential image. As described above, the color information is represented by a value of 0 to 1, and therefore the difference is also represented by a value of 0 to 1. Then, from these two differential images, the product of two differential values is calculated for each pixel. Consequently, as illustrated in FIG. 1, the calculated product for each pixel represents a corner's degree of angularity (hereinafter, "corner's degree"). Here, the corner's degree is a degree at which the pixel is visually recognized as being a corner. For example, a pixel located at a boundary between areas considerably differing in color information has a high corner's degree, while a pixel located at a boundary between areas less differing in color information has a low corner's degree. Pixels not located at boundaries or those representing lines at boundaries have a corner's degree of 0. In a sense, the corner's degree represents how much the pixel appears jagged.

Next, using the corner's degree calculated in the above described manner, antialiasing is carried out, which is described below with reference to FIG. 2. As a preparation for antialiasing, a blurred image is generated in advance from the original image, as illustrated in FIG. 2. Generation of such blurred image can be achieved by means of conventional gradation techniques. Then, for each pixel, the original image and the blurred image are blended according to the corner's degree to generate a processed image. Specifically, when the corner's degree is a, the values of the color information of each pixel in the original image and the blurred image are blended at a rate of $(1-\alpha):\alpha$. For example, in FIG. 2, for the pixels having the corner's degree of 0 (white pixels), the values of the color information are blended at a rate of 1:0. Therefore, the resulting pixel is identical to the one in the original image. For the pixels having the corner's degree of 1 (black pixels), the values of the color information are blended at a rate of 0:1. Therefore, the resulting pixel is identical to the one in the blurred image. Consequently, as the processed image illustrated in FIG. 2, it is possible to obtain a clear image with its corner effectively blurred.

In the above description, in the course of antialiasing, intermediate image data such as a differential image is generated. In practice, however, such intermediate image data does not have to be generated, and only required is to obtain the processed image in the end. In light of saving memory space, it is preferable to obtain the processed image without generating such intermediate image data. Therefore, in the embodiment of the present invention described below, processing is carried out for each pixel to generate the processed image without generating such intermediate image data.

Described below is an image processing apparatus according to the embodiment of the present invention.

Figure 3:
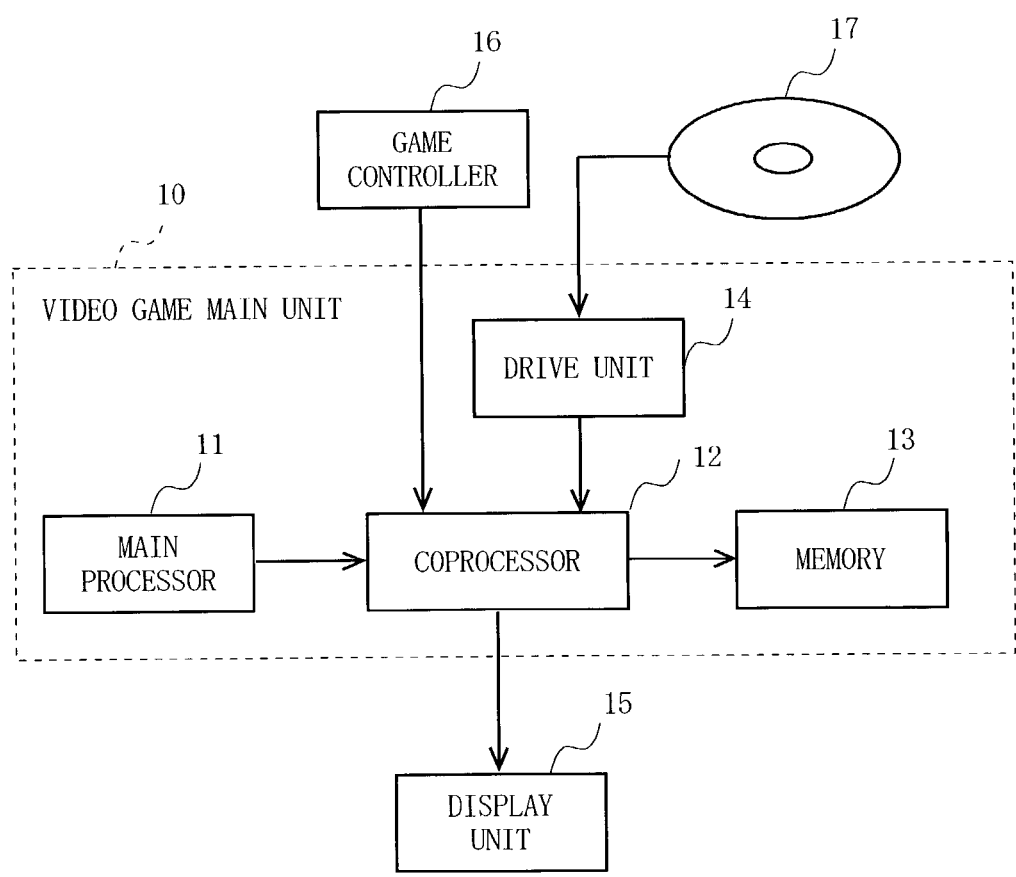
FIG. 3 is a block diagram illustrating the structure of an image processing apparatus according to one embodiment of the present invention.

FIG. 3 illustrates the construction of the image processing apparatus according to the embodiment of the present invention. Note that the present invention is exemplarily applied to a game machine in the present embodiment, but is not restricted thereto. In FIG. 3, the image processing apparatus includes a video game main unit 10, a display unit 15, a game controller 16, and a game disc 17. The video game main unit 10 includes a main processor 11, a coprocessor 12, memory 13, and a drive unit 14.

The memory 13 and the game disc 17 store an image processing program, which is executed by the coprocessor 12 on the image processing apparatus. Note that the image processing program may be stored in other recording media as long as it is readable and executable by the coprocessor 12. The memory 13 also has a program area and a data area as illustrated in a memory map of FIG. 4. The game disc 17 is a storage medium such as a DVD (Digital Versatile Disc), storing programs and data illustrated in a memory map of FIG. 5.

Figure 4:
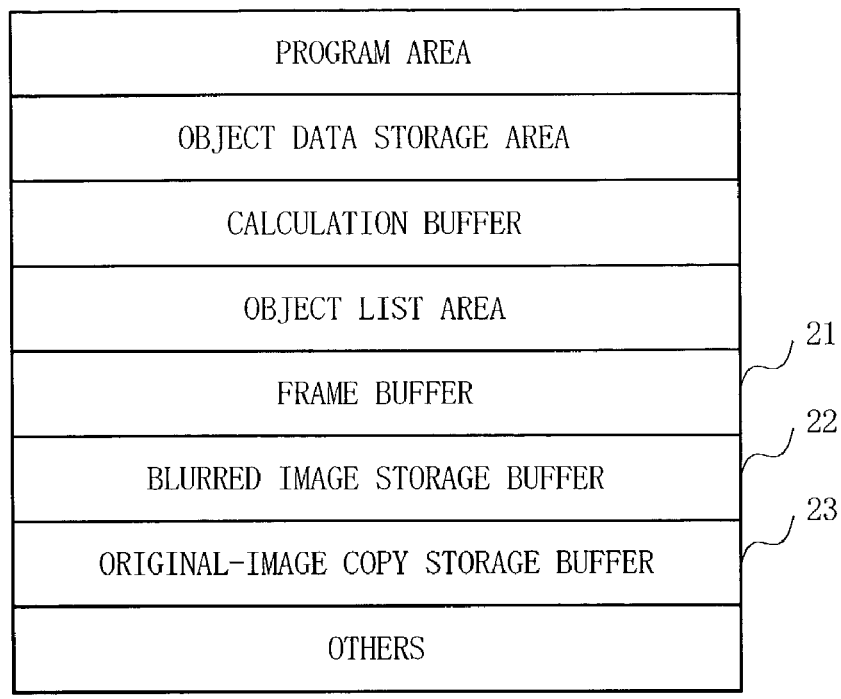
FIG. 4 is an illustration showing one example of memory map of memory 13.

In the memory map of the memory 13 illustrated in FIG. 4, the program area stores a basic system program for operating the video game main unit 10 as well as an object generating program that is read from the game disc 17 and other programs. An object data storage area stores image data of each object read from the game disc 17. A calculation buffer is a buffer for use in calculating color data that represents texture of each object. An object list area stores object information required for constructing one frame image. A frame buffer 21 stores image data for one frame to be outputted on the display unit 15. A blurred image storage buffer 22 stores blurred image data representing a blurred image obtained by blurring the original image before antialiasing stored in the frame buffer 21. An original-image copy storage buffer 23 stores a copy of the original image data before antialiasing stored in the frame buffer 21.

Figure 5:
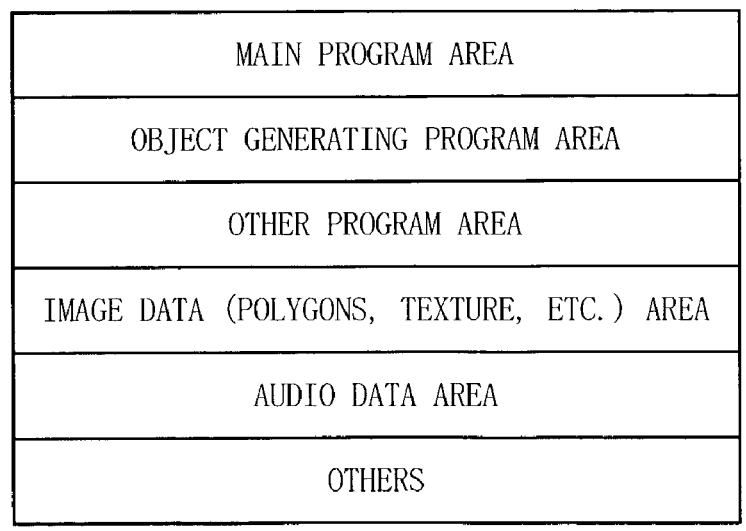
FIG. 5 is an illustration showing one example of memory map of a game disc 17.

In the memory map of the game disc 17 illustrated in FIG. 5, a main program area stores a basic program for operating the game. An object generating program area stores an image generating program such as an object generating program. Other program area stores programs other than the main program and the object generating program. An image data area stores various data relating to objects (polygons and texture required for graphics display of the game). An audio data area stores various data relating to audio representation for the game.

Figure 6:
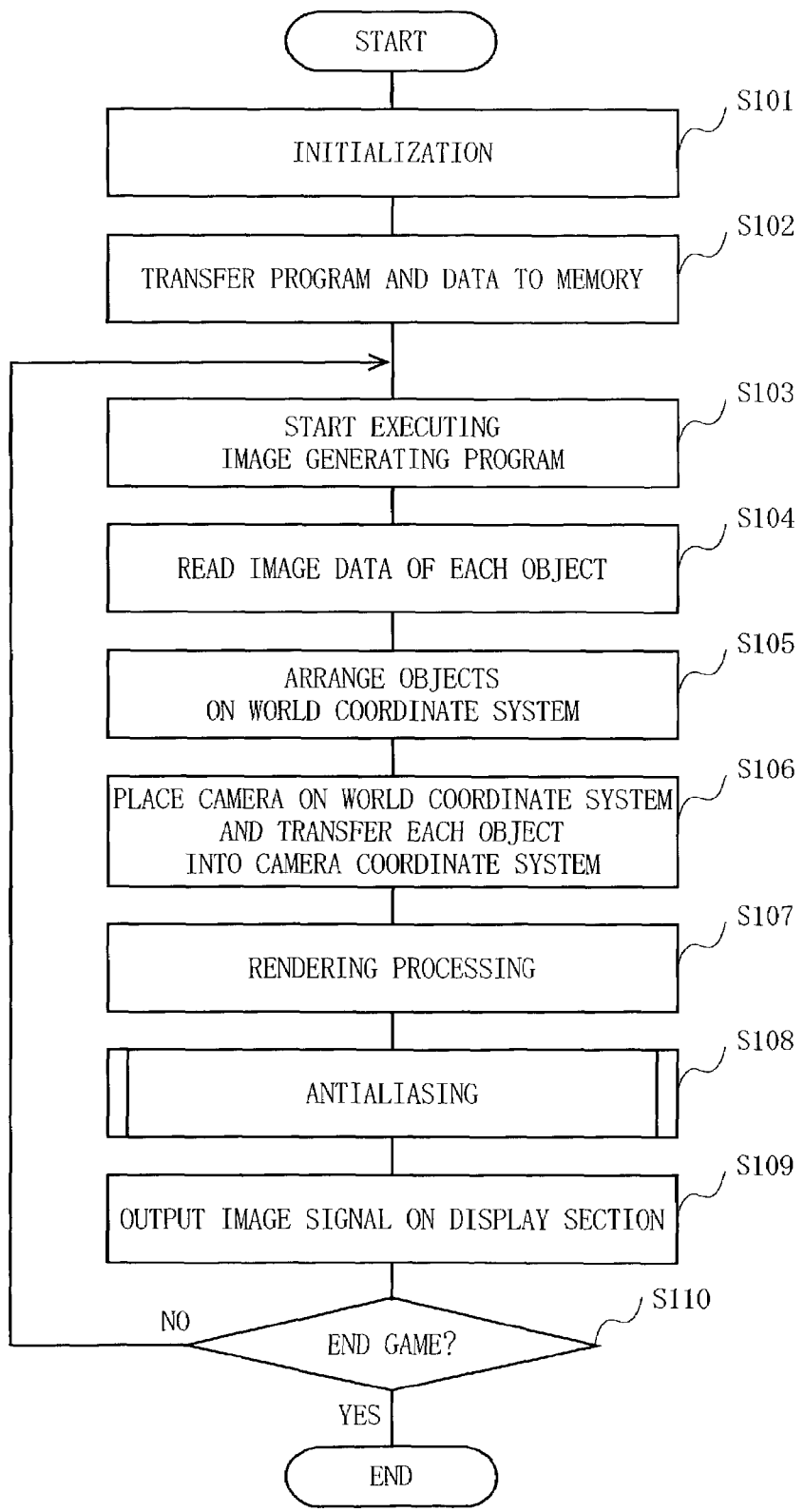
FIG. 6 is a flowchart showing the image processing operation of the image processing apparatus.
Figure 7:
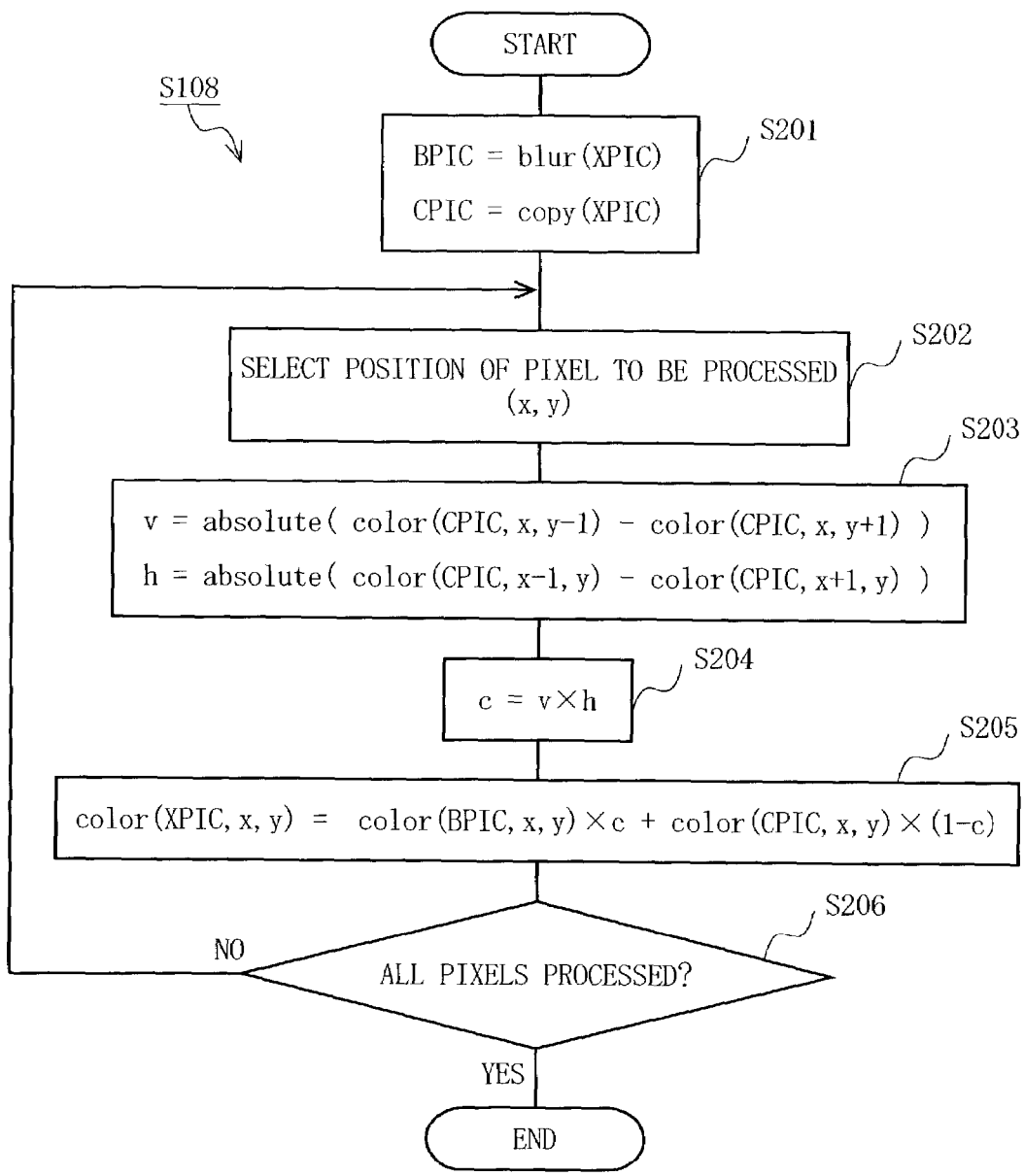
FIG. 7 is a flowchart showing the detailed procedure of antialiasing.

Next, with reference to FIGS. 6 and 7, described are how the image generating program is executed and how the processed image is displayed on a screen of the display unit 15 in the image processing apparatus illustrated in FIG. 3.

FIG. 6 is a flowchart for demonstrating the procedure of executing the image generating program in the image processing apparatus. FIG. 7 is a flowchart for demonstrating the detailed procedure of step S108 of FIG. 6.

In FIG. 6, an initialization program runs at power-up for initialization (step S101). Detected in this initialization are whether the game disc 17 has been set, whether the game controller 16 has been connected, and others. When initialization is completed, required programs and data are transferred from the game disc 17 to the memory 13 (step S102). Then, the main processor 11 starts executing the image generating program stored in the program area of the memory 13 (step S103), reading data of objects (game characters, for example) from the object data storage area of the memory 13 (step S104). The main processor 11 then arranges the read objects on a world coordinate system (step S105). The main processor 11 then puts a virtual camera on the world coordinate system at a location corresponding to a viewpoint of a game player. Based on the location of the virtual camera, the main processor 11 transforms each object into a camera coordinate system (step S106). This transform is achieved by matrix transform and two-dimensional coordinate transform on memory coordinates. Then, the coprocessor 12 carries out a rendering process on each object transformed into the camera coordinate system, and writes image data for each object in the frame buffer 21 (step S107). When the rendering process has been carried out on all objects, antialiasing is carried out based on the image data (the original image data) written in the frame buffer 21 (step S108), which will be described later in detail. Completion of antialiasing causes the frame buffer 21 to have processed-image data written therein. Based on the processed-image data written in the frame buffer 21, the coprocessor 12 outputs an image signal to the display unit 15(step S109). The processing in step S103 to S109 is repeatedly carried out until the game is over (step S110).

With reference to a flowchart shown in FIG. 7, described in detail below is antialiasing of step S108 of FIG. 6. In FIG. 7, when antialiasing is started, the coprocessor 12 generates, in step S201, a blurred image (BPIC) from the original image (XPIC) written in the frame buffer 21 through the above-described rendering process, and stores the blurred image in the blurred image storage buffer 22. Also, the coprocessor 12 stores a copy of the original image (CPIC) in the original-image copy storage buffer 23. To generate the blurred image, any conventional blurring technique can be used. When storing the images in the respective buffers is completed, the coprocessor 12 selects a location of a pixel to be processed (hereinafter, target pixel) (step S202). In the present embodiment, the coprocessor 12 carries out processing pixel by pixel, and therefore processes all pixels in the end. Once the target pixel is selected, the coprocessor 12 refers to the copy of the original image (CPIC) stored in the original-image copy storage buffer 23 to calculate a difference v in color information between two pixels vertically adjacent to the target pixel and a difference h in color information between two pixels horizontally adjacent to the target pixel (step S203). At this time, when the color information of each pixel is represented by the RGB system, difference calculation is made for each of these R, G, and B, separately. Similarly, in the steps following step S203 (steps S204 and S205), the process is carried out for each of R, G, and B, separately. Each difference is calculated based on values of the color information on a scale from 0 (minimum) to 1 (maximum). Therefore, the differences v and h can both take any value from 0 to 1.

Once the differences v and h are calculated for the target pixel, the coprocessor 12 calculates, in step S204, a product c of these differences. The product c indicates a corner's degree of the target pixel. Since the differences v and h can take any value from 0 to 1, the corner's degree c can also take any value from 0 to 1. The coprocessor 12 then blends the color information of the target pixel on the blurred image (BPIC) and the one on the original-image copy (CPIC) at a rate according to the corner's degree c. Based on the resultant color information obtained by blending, the coprocessor 12 then rewrites the data of the original image (XPIC) stored in the frame buffer 21. Specifically, the color information of the blurred image (BPIC) and the one of the original-image copy (CPIC) are blended at the rate of c:(1−c). Consequently, as the corner's degree c becomes larger (closer to 1), the color information of the processed image becomes more similar to the one of the blurred image (BPIC). Conversely, as the corner's degree c becomes smaller (closer to 0), the color information of the processed image becomes more similar to the one of the copy (CPIC). Note that, when the corner's degree c is 0, the color information of the processed image becomes identical to the one of the copy (CPIC), that is, the image stays the same as the original image (XPIC) without any blurring. The processing in the above steps S202 to S205 is carried out for each pixel being taken as the target pixel (step S206). Once all pixels of the image data stored in the frame buffer 21 have been processed, antialiasing is completed.

Figure 8:
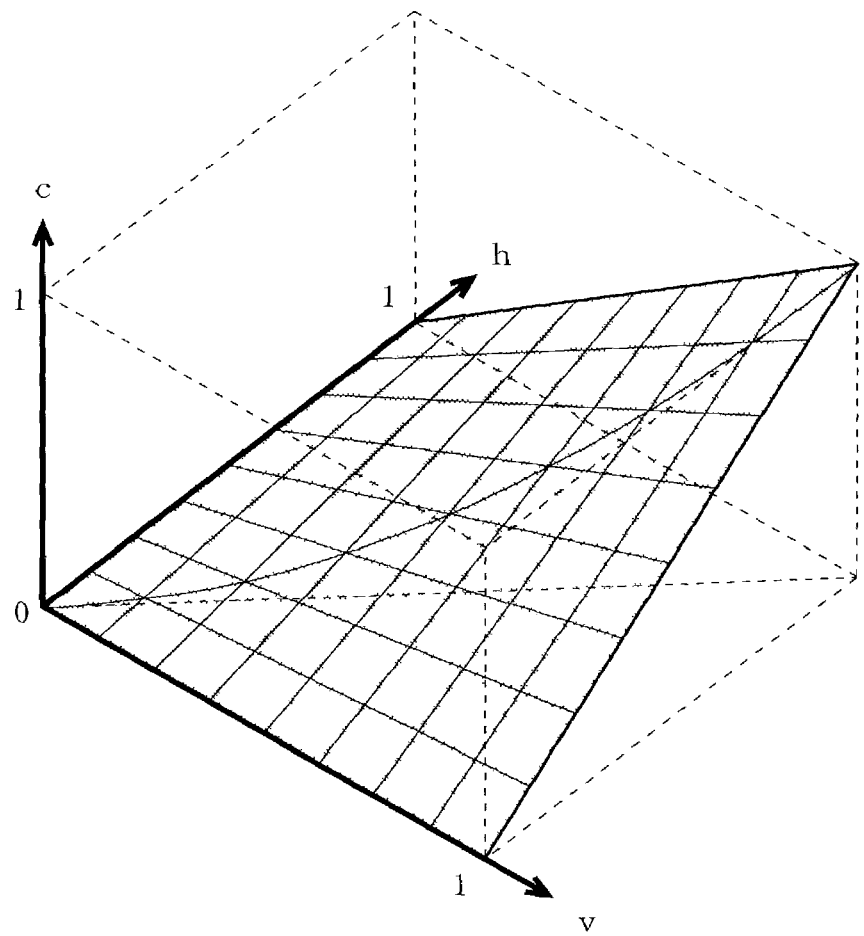
FIG. 8 is an illustration showing the relation among a difference v, a difference h, and a corner degree c.

As described above, in the present embodiment, the product of the difference v between the two pixels vertically adjacent to the target pixel and the difference h between the two pixels horizontally adjacent to the target pixel is calculated for obtaining the corner's degree c. FIG. 8 illustrates the relation among the difference h, the difference v, and the corner's degree c. In FIG. 8, values on the v axis indicate that the difference h between the two horizontally-adjacent pixels is 0, meaning that the target pixel is located on a horizontally-extended color boundary or is located in an area where no color boundary exists. Values on the h axis indicate, on the other hand, that the difference v between the two vertically-adjacent pixels is 0, meaning that the target pixel is located on a vertically-extended color boundary or is located in an area where no color boundary exists. In the present embodiment, if the difference v calculated for the target pixel is not on the h axis and the difference h also not on the v axis, the target pixel is determined as representing a corner, and is blurred according to the corner's degree. As illustrated in FIG. 8, the larger the difference v between the vertically-adjacent pixels and the larger the difference h between the horizontally-adjacent pixels, the larger a degree of blurring (hereinafter, blurring degree b).

In the present embodiment, if the difference v calculated for the target pixel is not on the h axis and the difference h not on the v axis, the corner's degree c is used as the blurring degree b for determining how much the target pixel is blurred, as shown in step S205 of FIG. 7. The blurring degree b is not restricted to the values represented as a curved surface in FIG. 8, but may be set arbitrarily. Also, it is possible to transform the corner's degree c into the blurring degree b by using a certain function, and then replace the corner's degree c with the blurring degree b in step S205. Furthermore, the function for transforming the corner's degree c into the blurring degree b may be arbitrarily adjustable by the user. Still further, this function may return 1 as the blurring degree b when the corner's degree c is more than a threshold, and 0 otherwise. Note that the blurring degree b should be 0 when the corner's degree c is 0. This prevents line portions from being blurred. Consequently, it is possible to generate a clear image with only jaggies (corners) effectively blurred.

In the present embodiment, when the image data is represented by color information in the RGB system, processing is carried out for each of these R, G, and B. Alternatively, for example, processing may be carried out based on monochrome color information generated by averaging the values of R, G, and B. This can reduce the image processing load per frame. In this case, however, some pixels may be visually recognized as corners, but not being processed as such. One such case occurs, for example, when a pixel located on a boundary between a red area and a blue area represents a corner, but the both areas have the same RGB average value. Therefore, in order to reliably determine whether the pixel represents a corner, it is preferable to carry out processing for each of R, G, and B, separately.

Note that various information other than the RGB system may be used as the color information, such as lightness and luminance.

In the present embodiment, the image data for one frame is stored in the frame buffer 21 through the rendering process, and then antialiasing is carried out on the entire image represented by the stored image data. Alternatively, antialiasing is carried out on the respective portions (each object and background portion, for example) separately. For example, step S108 may be followed by a step of rendering image portions not desired to be antialiased in the frame buffer 21. Specifically, in step S107, only the image portions desired to be antialiased are rendered in the frame buffer 21, and antialiased in step S108. Then, after step S108, the image portions not desired to be antialiased are additionally rendered therein. This can prevent antialiasing effects on the appearances of characters and graphics designed in advance for display on a game screen.

As described above, according to the present embodiment, it is not necessary to calculate edge portions of polygons at a resolution higher than that used for display. Therefore, the memory capacity does not have to be large. Also, the processing load associated with antialiasing on the image data for one frame is not varied according to the number of frames drawn by polygons, but is approximately constant. This contributes stability of the processing load. Therefore, the present invention can be expediently used in the processing that requires stable operation, such as game processing. Furthermore, only the portions appearing jagged can be effectively blurred. This can prevent the entire image from appearing blurred.

While the invention has been described in detail, the foregoing description is in all aspects illustrative and not restrictive. It is understood that numerous other modifications and variations can be devised without departing from the scope of the invention.

What is claimed is:

1. An image processing apparatus for antialiasing an image to be displayed on a display unit, comprising:
    corner determining means for determining whether an arbitrary pixel of image data represents a corner; and
    blurring means for blurring the pixel determined by the corner determining means as representing the corner, wherein, when the arbitrary pixel of the image data is taken as a target pixel, the corner determining means determines whether the target pixel represents the corner based on a difference in color information between two pixels vertically adjacent to the target pixel and/or a difference in color information between two pixels horizontally adjacent to the target pixel.

2. The image processing apparatus according to claim 1, wherein
    the corner determining means determines that the target pixel represents the corner when there are the difference in color information between the two pixels vertically adjacent to the target pixel and the difference in color information between the two pixels horizontally adjacent to the target pixel.

3. The image processing apparatus according to claim 1, wherein
    the blurring means includes blurred image generating means for generating blurred image data by blurring the image data, and
    the blurring means blurs the arbitrary pixel determined by the corner determining means as representing the corner by referring to a pixel of the blurred image data corresponding to the arbitrary pixel.

4. An image processing apparatus for antialiasing an image to be displayed on a display unit, comprising:
    corner determining means for determining whether an arbitrary pixel of image data represents a corner; and
    blurring means for blurring the pixel determined by the corner determining means as representing the corner, wherein
    the corner determining means calculates a corner's degree indicating how much the arbitrary pixel of the image data represents the corner, and
    the blurring means blurs the arbitrary pixel of the image data based on the corner's degree.

5. The image processing apparatus according to claim 4, wherein
    when the arbitrary pixel of the image data is taken as a target pixel, the corner determining means calculates the corner's degree of the target pixel based on a difference in color information between two pixels vertically adjacent to the target pixel and a difference in color information between two pixels horizontally adjacent to the target pixel.

6. The image processing apparatus according to claim 5, wherein
    the corner determining means calculates the corner's degree by finding a product of the difference in color information between the two pixels vertically adjacent to the target pixel and the difference in color information between the two pixels horizontally adjacent to the target pixel.

7. The image processing apparatus according to claim 4, wherein
    the blurring means includes blurred image generating means for generating blurred image data by blurring the image data, and
    the blurring means blurs the image data by blending color information of the arbitrary pixel of the image data with color information of a pixel of the blurred image data corresponding to the arbitrary pixel at a rate corresponding to the corner's degree.

8. The image processing apparatus according to claim 1, wherein
    the image data has color information in an RGB system, and
    the corner determining means and the blurring means carry out processing on each of R, G, and B in the RGB system separately.

9. An image processing apparatus for antialiasing an image to be displayed on a display unit, comprising:
    corner determining means for determining whether an arbitrary pixel of image data represents a corner;
    blurring means for blurring the pixel determined by the corner determining means as representing the corner; and
    monochrome image generating means for generating, based on color information of the image data, monochrome image data composed of color information indicating only lightness, wherein
    the corner determining means determines whether the arbitrary pixel of the image data represents the corner based on the monochrome image data.

10. An image processing program embodied on a storage medium readable by a computer, the program for antialiasing an image to be displayed on a display unit, the program causing the computer to perform the steps of:
    determining whether an arbitrary pixel of image data represents a corner; and blurring the arbitrary pixel determined in the corner determining step as representing the corner, wherein in the corner determining step, when the arbitrary pixel of the image data is taken as a target pixel, whether the target pixel represents the corner is determined based on a difference in color information between two pixels vertically adjacent to the target pixel and/or a difference in color information between two pixels horizontally adjacent to the target pixel.

11. The image processing program according to claim 10, wherein in the corner determining step, it is determined that the target pixel represents the corner when there are the difference in color information between the two pixels vertically adjacent to the target pixel and the difference in color information between the two pixels horizontally adjacent to the target pixel.

12. The image processing program according to claim 10, wherein the blurring step includes a step of generating blurred image data by bluffing the image data, and in the bluffing step, the arbitrary pixel determined in the corner determining step as representing the corner is blurred with reference to a pixel of the blurred image data corresponding to the arbitrary pixel.

13. An image processing program embodied on a storage medium readable by a computer, the program for antialiasing an image to be displayed on a display unit, the program causing the computer to perform the steps of:

determining whether an arbitrary pixel of image data represents a corner; and blurring the arbitrary pixel determined in the corner determining step as representing the corner, wherein in the corner determining step, a corner's degree indicating how much the arbitrary pixel of the image data represents the corner is calculated, and in the blurring step, the arbitrary pixel of the image data is blurred based on the corner's degree.

14. The image processing program according to claim 13, wherein in the corner determining step, when the arbitrary pixel of the image data is taken as a target pixel, the corner's degree of the target pixel is calculated based on a difference in color information between two pixels vertically adjacent to the target pixel and a difference in color information between two pixels horizontally adjacent to the target pixel.

15. The image processing program according to claim 14, wherein in the corner determining step, the corner's degree is calculated by finding a product of the difference in color information between the two pixels vertically adjacent to the target pixel and the difference in color information between the two pixels horizontally adjacent to the target pixel.

16. The image processing program according to claim 13, wherein the blurring step includes a step of generating blurred image data by bluffing the image data, and in the blurring step, the image data is blurred by blending color information of the arbitrary pixel of the image data with color information of a pixel of the blurred image data corresponding to the arbitrary pixel at a rate corresponding to the corner's degree.

17. The image processing program according to claim 10, wherein the image data has color information in an RGB system, and in the corner determining step and the blurring step, processing is carried out on each of R, G, and B in the RGB system separately.

18. An image processing program embodied on a storage medium readable by a computer, the program for antialiasing an image to be displayed on a display unit, the program causing the computer to perform the steps of:

determining whether an arbitrary pixel of image data represents a corner;

blurring the arbitrary pixel determined in the corner determining step as representing the corner; and generating, based on color information of the image data, monochrome image data composed of color information indicating only lightness, wherein in the corner determining step, whether the arbitrary pixel of the image data represents the corner is determined based on the monochrome image data.

19. An image processing program embodied on a storage medium readable by a computer, the program for antialiasing an image to be displayed on a display unit, the program causing the computer to perform the steps of:

generating blurred image data by bluffing image data;

sequentially selecting one of pixels of the image data as a target pixel;

calculating a first difference in color information between two pixels vertically adjacent to the target pixel;

calculating a second difference in color information between two pixels horizontally adjacent to the target pixel;

calculating a corner's degree indicating how much the target pixel represents a corner based on the first and second differences; and and (x+1, y) of the image and the difference in color between pixels at positions (x, y−1) and (x, y+1) of the image.

20. An image processing program embodied on a storage medium readable by a computer, the program for antialiasing an image to be displayed on a display unit, the program causing the computer to perform the steps of:

generating blurred image data by blurring image data;

generating monochrome image data composed of color information indicating only lightness, based on color information of the image data;

sequentially selecting one of pixels of the image data as a target pixel;

calculating a first difference in color information between two pixels vertically adjacent to the target pixel;

calculating a second difference in color information between two pixels horizontally adjacent to the target pixel;

calculating a corner's degree indicating how much the target pixel represents a corner based on the first and second differences; and blurring the target pixel by referring to color information of a pixel of the blurred image data corresponding to the target pixel at a rate corresponding to the corner's degree.

21. An antialiasing method comprising:

selecting a pixel at a position (x, y) of an image;

calculating at least one of a difference in color between pixels at positions (x−1, y) and (x+1, y) of the image and a difference in color between pixels at positions (x, y−1) and (x, y+1) of the image; and blurring the selected pixel based on the calculated at least one difference in color.

22. The method according to claim 21, wherein the calculating comprises calculating both the difference in color between pixels at positions (x−1, y).

23. The method according to claim 21, further comprising:
selecting, from a blurred version of the image, a pixel which corresponds to the selected pixel,
wherein the blurring involves blending the selected pixel and the corresponding pixel.

24. The method according to claim 23, wherein the calculated at least one difference in color determines the amount of blending of the selected pixel and the corresponding pixel.

25. The method according to claim 24, wherein the amount of blending ranges from no blending to complete blending in which the selected pixel is effectively replaced with the corresponding pixel.

26. The method according to claim 21, wherein the calculating and blurring are performed separately for each of a plurality of different colors of the selected pixel.

27. The method according to claim 21, further comprising:
repeating the selecting, calculating and bluffing for at least one other pixel of the image.

28. The method according to claim 21, wherein the calculating further comprises calculating a product P of the difference in color between pixels at positions (x−1, y) and (x+1, y) of the image and the difference in color between pixels at positions (x, y−1) and (x, y+1) of the image.
blurring the target pixel by referring to color information of a pixel of the blurred image data corresponding to the target pixel at a rate corresponding to the corner's degree.

29. The method according to claim 28, wherein the blurring involves adding together a first result obtained by multiplying P with data indicative of a blurred counterpart of the selected pixel and a second result obtained by multiplying (1−P) with data indicative of the selected pixel.

30. A storage device storing computer-executable instructions for implementing the method of claim 21.

31. An image processing apparatus comprising a processing system that performs antialiasing in accordance with the method of claim 21.

32. An antialiasing method comprising:
selecting a pixel of an image;
calculating at least one of a difference between respective pixels on opposite sides of the selected pixel in a horizontal direction and a difference between respective pixels on opposite sides of the selected pixel in a vertical direction; and
bluffing the selected pixel based on the calculated at least one difference.

33. A storage device storing computer-executable instructions for implementing the method of claim 32.

34. An image processing apparatus comprising a processing system that performs antialiasing in accordance with the method of claim 32.

35. An antialiasing method comprising:
selecting a pixel of an image;
determining a corner degree indicative of a degree to which the selected pixel corresponds to a corner; and
bluffing the selected pixel by an amount determined based on the determined corner degree.

36. A storage device storing computer-executable instructions for implementing the method of claim 35.

37. An image processing apparatus comprising a processing system that performs antialiasing in accordance with the method of claim 35.

* * * * *

UNITED STATES PATENT AND TRADEMARK OFFICE
CERTIFICATE OF CORRECTION

PATENT NO. : 7,050,066 B2 Page 1 of 1
APPLICATION NO. : 10/209661
DATED : May 23, 2006
INVENTOR(S) : Ohta et al.

It is certified that error appears in the above-identified patent and that said Letters Patent is hereby corrected as shown below:

Col. 11, In claim 12, line 5, change "bluffing" to --blurring--.

Col. 11, In claim 16, line 4, change "bluffing" to --blurring--.

Col. 12, In claim 19, line 5, change "bluffing" to --blurring--.

Col. 12, In claim 19, lines 15-17, delete "and (x+1, y) of the image and the difference in color between pixels at positions (x, y-1) and (x, y+1) of the image" and insert --blurring the target pixel by referring to color information of a pixel of the blurred image data corresponding to the target pixel at a rate corresponding to the corner's degree--.

Col. 13, In claim 22, line 3, after "(x-l, y)", insert -- and (x+1, y) of the image and the difference in color between pixels at positions (x, y-1) and (x, y+1) of the image--.

In col. 13, lines 30-33 (between claims 28 and 29) delete "blurring the target pixel by referring to color information of a pixel of the blurred image data corresponding to the target pixel at a rate corresponding to the corner's degree".

Col. 14, In claim 32, line 8, change "bluffing" to --blurring--.

Col. 14, In claim 35, line 5, change "bluffing" to --blurring--.

Signed and Sealed this

Twenty-sixth Day of December, 2006

JON W. DUDAS
*Director of the United States Patent and Trademark Office*